Jan. 16, 1923.
A. STEWART.
TRACTOR TRAILER.
FILED DEC. 6, 1920.

A. STEWART.
TRACTOR TRAILER.
FILED DEC. 6, 1920.

Inventor
Alexander Stewart

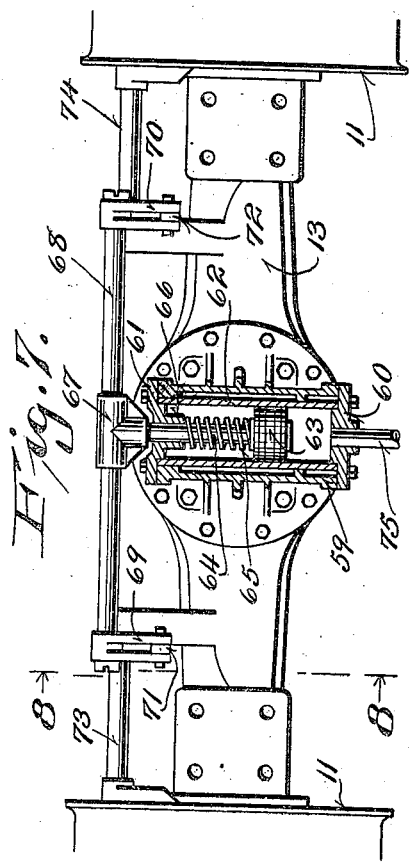
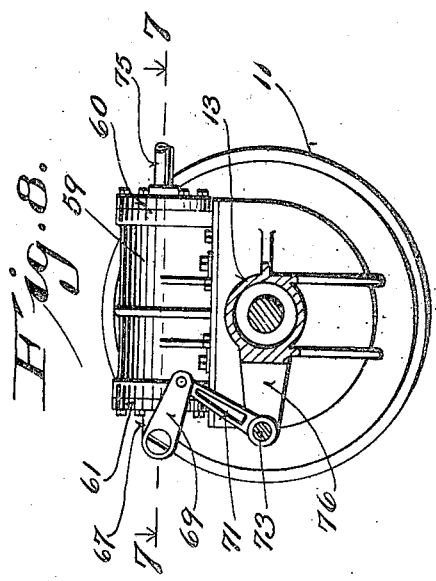

Patented Jan. 16, 1923.

1,442,708

UNITED STATES PATENT OFFICE.

ALEXANDER STEWART, OF WAUPACA, WISCONSIN.

TRACTOR TRAILER.

Application filed December 6, 1920. Serial No. 428,770.

*To all whom it may concern:*

Be it known that I, ALEXANDER STEWART, a citizen of the United States, and resident of Waupaca, in the county of Waupaca and State of Wisconsin, have invented certain new and useful Improvements in Tractor Trailers; and I do hereby declare that the following is a full, clear, and exact description thereof.

My invention relates to tractor trailers and more particularly to the chassis and the steering and guiding mechanism therefor.

One important object of the invention is to provide a guiding mechanism which may readily be manipulated to make sharp turns, and which may also be controlled to prevent wabbling or whipping when traveling on a straight road.

Another object is to provide a guiding mechanism, which will yield while making slight turns, but which may at will be manipulated to make sharp turns.

Another important object is to provide a supporting truck made up largely of stock parts, and in which provision is made for operating the brakes by compressed air.

A still further object is to improve generally the structure of the trucks, by which the body is supported.

I have in the present instance shown and described the device as applied to a trailer of the type which may be drawn from either end. It will be understood, however, that this is merely illustrative and that the invention includes other embodiments which may fall within the scope of the appended claims.

I will now describe my invention in connection with the accompanying drawings in which:

Figure 4 is a detail sectional view on the line 4—4 of Figure 1.

Figure 5 is a detail sectional view on the line 5—5 of Figure 2.

Figure 6 is a detail sectional view on the line 6—6 of Figure 2, showing the locking bar in two positions.

Figure 7 is a plan view of one of the supporting trucks and housing with the compressed air cylinder shown in section on the line 7—7 of Figure 8, and Figure 8 is a sectional view taken on the line 8—8 of Figure 7.

Figure 1:
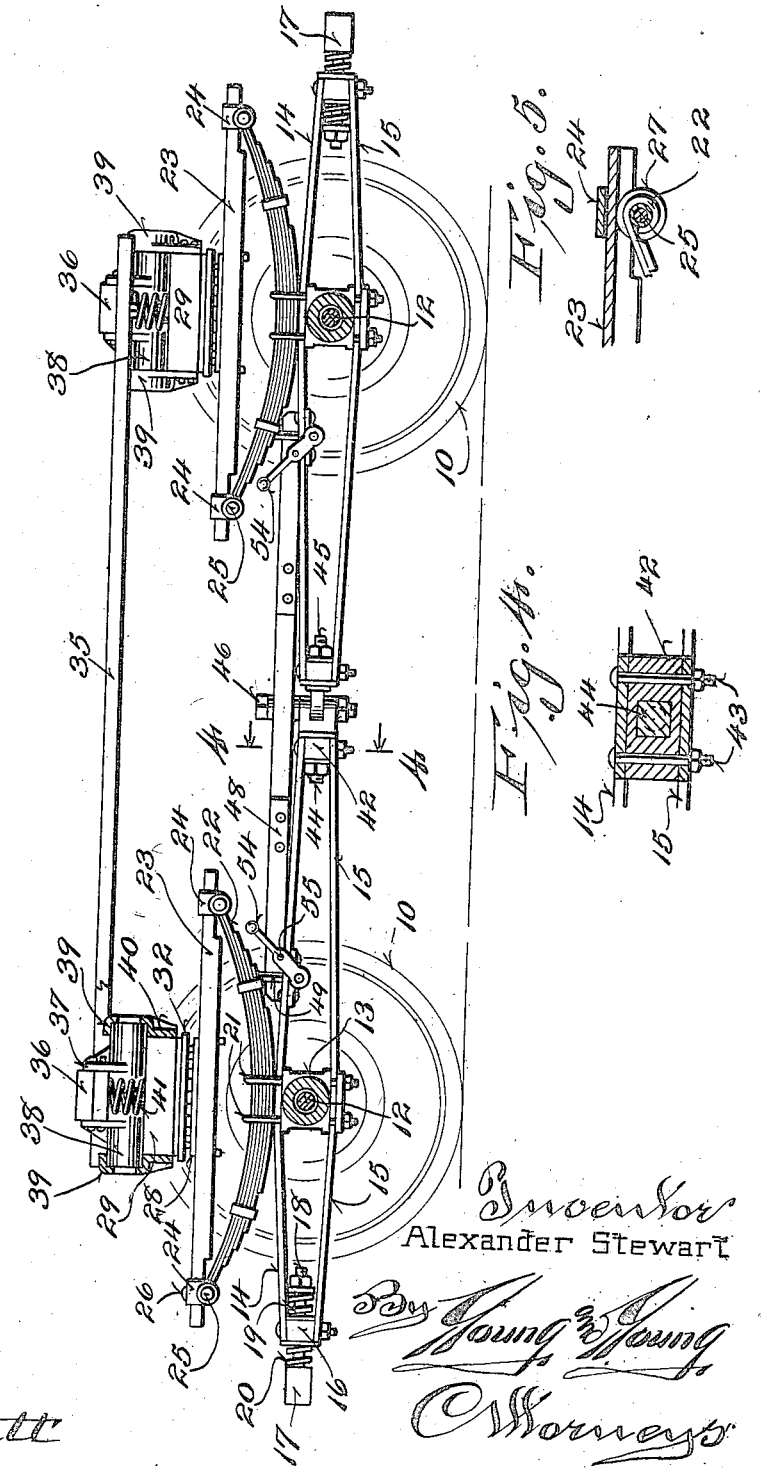
Figure 1 is a side elevation with parts shown in section.

Similar reference characters will refer to similar parts throughout the several views. The trailer of which my invention forms a part is supported by the wheels 10, which are provided with the usual brake drums 11 and supported on the two-part axles 12, 12ª which are mounted in the housings 13. As the two ends of the trailer are substantial duplicates of each other, only one end will be described.

Rigidly attached to the axle housing is a draw bar which consists of the upper and lower members 14 and 15, which are substantially diamond-shaped and pass over and under the axle housing respectively. The outer ends of the members 14 and 15 are rigidly attached to the hitch block 16, through which passes the bolt 18. The outer end of the bolt is formed into the hitching member 17, and is surrounded on each side of the hitch block 16 by the buffer springs 19 and 20 respectively.

The U-bolts 21 pass through the housing 13 firmly securing thereto the leaf springs 22. These springs carry a supporting member which consists of the two longitudinal channel members 23, connected by the transverse member 28. The connection between each of the springs and its corresponding member 23 consists of a U-shaped member 24, pivoted to the end of the spring by the pivot pin 25. It will be noted that one of the members 24 is secured against sliding movement on the member 23 by a bolt 26, as shown in the left hand end of Figure 1. The member 23 at the other end of the trailer is freely slidable within the U-shaped members 24 for a purpose, which will later appear.

Each of the pivot pins 25 is also provided with the anti-friction rollers 27, which travel within the channel member 23. The bolster 29 is mounted above the transverse member 28, and its sides are rabbeted as shown at 30, and passing underneath the bolster and secured in the rabbets 30 is the channel member 31. Secured to the underside of this channel member is a bearing plate 32, provided with a circular opening which receives the circular bearing member 33, which is attached to the upper surface of the bolster. The bearing members 32 and 33 receive between them the ball bearings 33'. The bolster 29 and the transverse member 28 are secured against vertical displacement by a king bolt 34. The body of the trailer which is supported by the bolsters 29 consists of the longitudinal frame members 35 and the transverse members 36. To the sides of each of the transverse members are riveted the ears 37, which carry the stub shaft 38. Journalled to the ends of this stub shaft are the bearing members 39, which are extended downwardly as shown at 40, and secured to the bolster 29. Thus, it will be seen that the body may rock to a limited extent in the journal bearings 39. This rocking movement is, however, resisted by the springs 41.

The draw bar members 14 and 15 are secured at their inner ends to the blocks 42 by the bolts 43. The bolts 44 and 45 extend longitudinally through the blocks 42 and are pivoted together on the pivot bolt 46. The tension bar 47 is pivoted midway of its ends on the bolt 46 above the draw bars. Each end of the tension bar is provided with a leaf spring 48, the end of which as shown projects into the U-shaped part 49 of a transverse rod 50, which is journalled at 51 and 52 on the draw bar. The rod 50 is provided at its ends with the cranks 53 and 54 to which may be attached any suitable means for rocking the rod 50 and thus releasing the end of the tension bar 47 from the U-shaped portion 49. A pin 55 extends laterally from the crank 54 and provides an abutment for limiting the rocking movement of the rod 50 in either direction.

Figure 2:
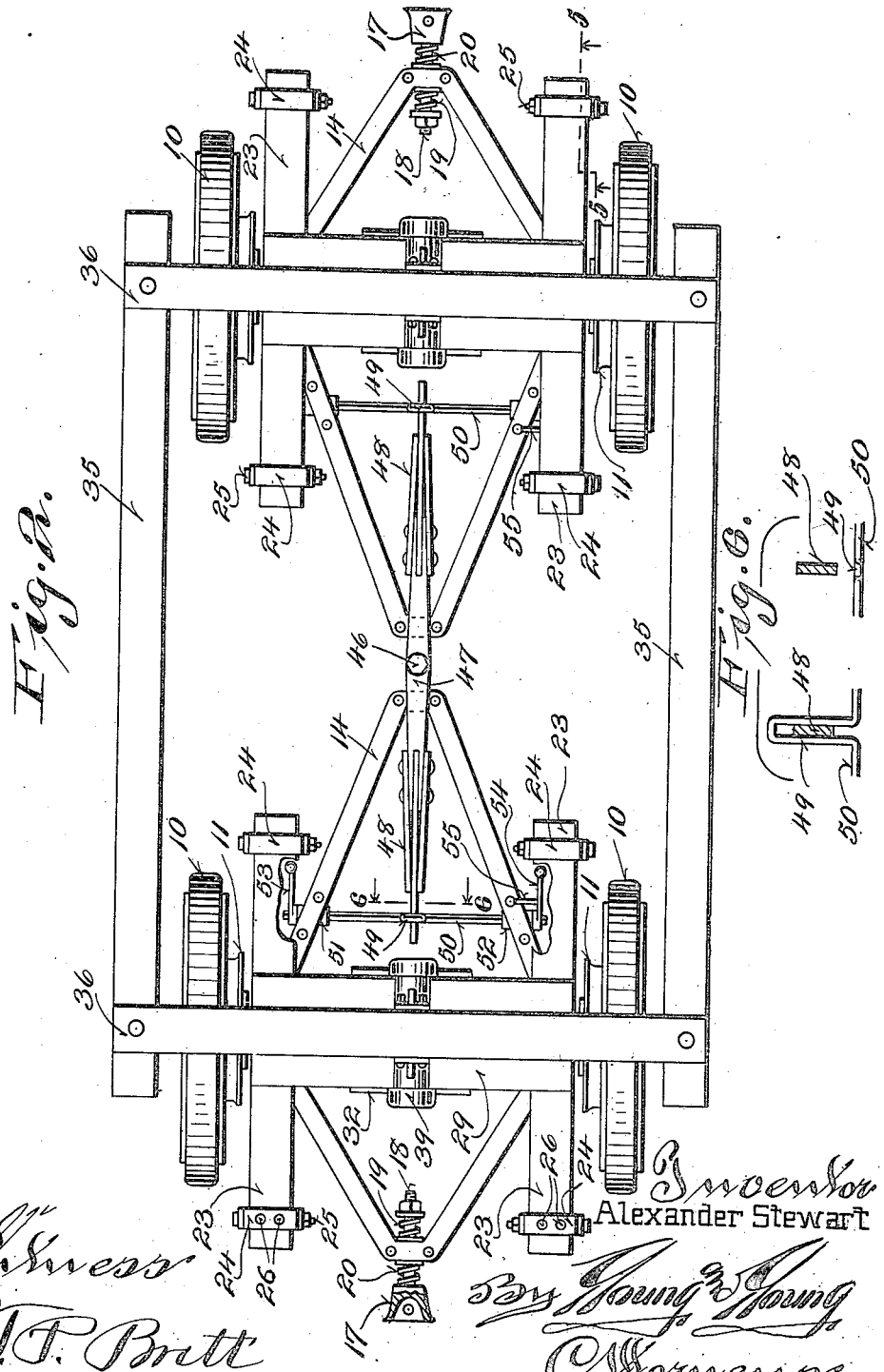
Figure 2 is a plan view of the device.
Figure 3:
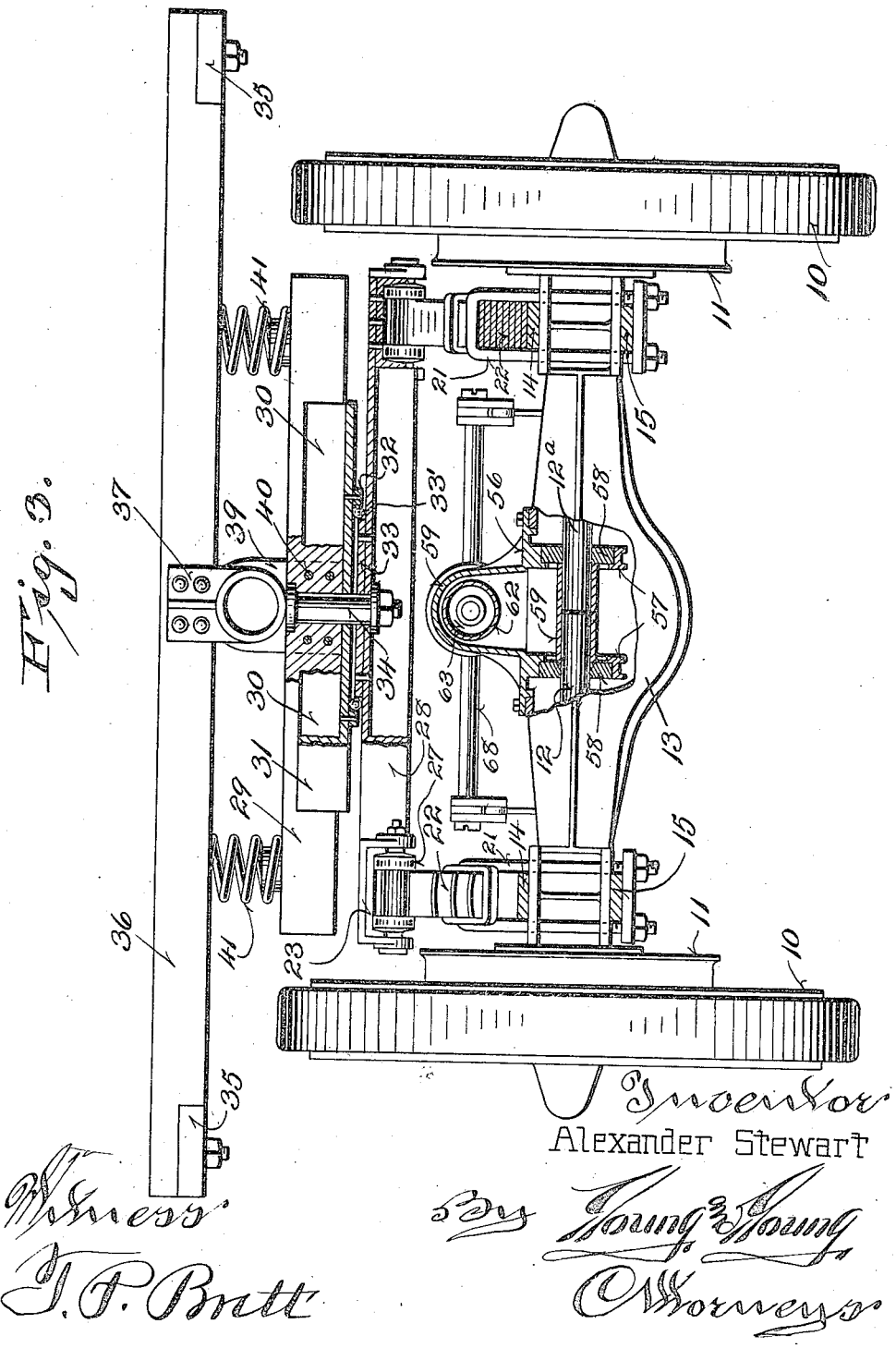
Figure 3 is an end view, some parts being shown in elevation and others in section.

When the trailer is traveling on a substantially straight road, the rod 50 is maintained in the position shown in Figure 2, thus holding the tension bar 47 against swinging movement. The leaf springs 48 will permit a limited turning movement of the trucks, but will normally hold the said trucks in a straight path and prevent wabbling or whipping. When it is desired to make a sharp turn, the rod 50 is rocked into the position shown in the right hand part of Figure 6, thus releasing the end of the tension bar 47. Thus the trucks are free to turn laterally.

It will be noted, however, that when the turning movement is made, the trucks will pivot about the king bolt 34. The channel members 23 at the left hand end, as viewed in Figures 1 and 2, are secured against longitudinal movement by the bolt 26, and will therefore turn about the axis of the king bolt 34. The center of the draw bar 14 will therefore swing in the arc of a circle with the king bolt as a center. This will increase the distance between the point 46 and the king bolt at the other end of the trailer. Compensation for this increased distance is obtained by the sliding of the clips 24 on the channel members 23 at the right hand end of the trailer.

As hereinbefore stated, the axle is in two parts and journalled within the housing 13. This housing is provided midway of its ends with the cover plate 56, depending from which are the ears 57, which support the bearing members 58, in which the axle is journalled. Extending between the two bearing members is the sleeve 59, which surrounds the adjacent ends of the two parts of the axle and keeps the same in alignment. Extending above the plate and integral therewith is the U-shaped portion 59, the ends of which are closed by the plates 60 and 61. Within this U-shaped portion is the cylinder 62 within which reciprocates the piston head 63, carried on the piston rod 64 and spring-held by the spring 65, which bears against the boss 66 which extends from the plate 61. The opposite end of the piston rod is connected by a T coupling 67 with the transverse rod 68, which is carried back and forth by the piston rod when it reciprocates. The ends of the rod 68 are connected by the rings 69 and 70 with the arms 71 and 72 respectively, which are mounted on the rock shafts 73 and 74, which are journalled in the ears 76 projecting from the housing 13. The piston 63 is operated by fluid-pressure which is introduced through the inlet 75, thus moving the piston against the pressure of the spring 65 and rocking the shafts 73 and 74, which co-operate with the brake drums 11 in a well known manner.

Having thus described my invention, what I desire to secure by Letters Patent of the United States is:

1. A vehicle comprising two wheel supported axles, a draw bar rigidly connected with each axle, a pivotal connection between said draw bars, a longitudinally disposed tension bar pivotally mounted on the same pivot, and resilient means for holding said tension bar in fixed relation to said draw bars to yieldingly hold said axles in parallel relation.

2. A vehicle comprising two wheel supported axles, a draw bar rigidly connected with each axle, a pivotal connection between said draw bars, a longitudinally disposed tension bar pivotally mounted on the same pivot, resilient means for holding said tension bar in fixed relation to said draw bars to yieldingly hold said axles in parallel relation, and means for releasing the holding means from one of said draw bars to permit the vehicle to make a sharp turn.

3. A vehicle comprising two wheel supported axles, a draw bar rigidly connected with each axle, each draw bar having a hitching member attached to one end, the other ends of the draw bars being pivotally connected to each other, a longitudinally disposed tension bar pivotally mounted on the same pivot and resilient means for holding said tension bar in fixed relation to said draw bars to yieldingly hold said axle in parallel relation.

4. A vehicle comprising two wheel supported axles, a draw bar rigidly connected with each axle, each draw bar having a hitching member attached to one end, the other ends of the draw bars being pivotally connected to each other, springs supported by each axle, supporting members carried by said springs, bolsters mounted on said supporting members, one above each axle, a body rigidly connected with both bolsters, the supporting members being rotatable with respect to said bolsters to permit the axles to swing in making a turn, a longitudinally disposed tension bar pivotally mounted on the same pivot as the pivot connection between the draw bars, resilient means for holding said tension bar in fixed relation to said draw bars to yieldingly hold said axles in parallel relation, and means for releasing the holding means from one of said draw bars to permit the vehicle to make a sharp turn.

In testimony that I claim the foregoing I have hereunto set my hand at Milwaukee, in the county of Milwaukee and State of Wisconsin.

ALEXANDER STEWART.